UNITED STATES PATENT OFFICE.

SAMUEL PEACOCK, OF CHICAGO, ILLINOIS, ASSIGNOR TO INTERNATIONAL AGRICULTURAL CORPORATION, OF NEW YORK, N. Y., A CORPORATION OF NEW YORK.

PROCESS OF HYDRATING PHOSPHORUS PENTOXID.

1,089,784.   Specification of Letters Patent.   Patented Mar. 10, 1914.

No Drawing.   Application filed September 7, 1912.   Serial No. 719,153.

*To all whom it may concern:*

Be it known that I, SAMUEL PEACOCK, a citizen of the United States, residing at Chicago, in the county of Cook and State of Illinois, have invented certain new and useful Improvements in Processes of Hydrating Phosphorus Pentoxid; and I do hereby declare the following to be a full, clear, and exact description of the invention, such as will enable others skilled in the art to which it appertains to make and use the same.

This invention relates to the hydration of phosphoric anhydrid, and has for its object to provide a process which will accomplish this purpose in a more expeditious manner than those heretofore proposed.

To these ends the invention consists in the novel steps constituting my process as will be hereinafter disclosed and particularly pointed out in the claims.

As is well known, phosphorus pent-oxid, $P_2O_5$, in the form of a vapor does not readily hydrate or combine with water at ordinary temperatures to form phosphoric acid. It may in fact be passed through a water spray, or drawn repeatedly through a gas scrubber, at ordinary temperatures, without suffering any material hydration. I have discovered on the other hand that if the water contains a quantity of phosphoric acid so that it has a specific gravity of say 1.1 Bé. or 1.2 Bé. the hydration is greatly facilitated, and also that water at say 100° C. effects the fixation of the water of hydration with a velocity many times that of water at 20° C. I have further discovered that better results are attained with hot water than with steam, and that the best results are attained when the water is heated above 100° C. without forming steam. Accordingly in carrying out my process, I provide a water solution containing phosphoric acid and having a specific gravity of say 1.2 Bé., which is then heated to just below its boiling point and I subject the phosphorus pent-oxid to said solution.

For commercial purposes, I use any suitable type of gas scrubber, such for example as the Gay Lussac tower, or the Glover tower well known in connection with the manufacture of sulfuric acid, and I spray the water at a temperature slightly less than 100° C. by any suitable means, until it has hydrated enough of the pent-oxid to form a solution having a specific gravity of substantially 1.2 Bé. When this occurs, the reaction velocity increases as above stated, and the heat liberated is soon sufficient to raise the temperature to or above the boiling point of the solution. Accordingly the heating means for the water originally employed, is so regulated as to not permit the solution to boil, but to maintain it, on the other hand, below its boiling point.

Of course, in large scale operations more or less of the pent-oxid is unavoidably hydrated in the form of vapor which must be condensed, and I effect this by exposing the same to cooling condenser surfaces in the usual manner, as for example by passing said vapors through cold gas scrubbers or condensers.

What I claim is:—

1. The process of hydrating phosphorus pent-oxid, $P_2O_5$, which consists in subjecting the same to the action of water at a temperature above 90° C. until sufficient phosphoric acid has formed to produce a solution of substantially 1.2 Baumé, and then maintaining the temperature above 100° C., substantially as described.

2. The process of hydrating phosphorus pent-oxid, $P_2O_5$, which consists in subjecting the same to the action of hot water at a temperature above 90° C. until sufficient phosphoric acid has formed to produce a solution of substantially 1.2 Baumé, and then maintaining the temperature above 100° C., but below the boiling point of said solution, substantially as described.

In testimony whereof, I affix my signature, in presence of two witnesses.

SAMUEL PEACOCK.

Witnesses:
T. A. WITHERSPOON,
N. CURTIS LAMMOND.